United States Patent [19]

Hunt

[11] 3,816,310

[45] June 11, 1974

[54] METHOD FOR PREPARING HIGHLY BASIC GREASE AND RUST INHIBITING COMPOSITIONS

[75] Inventor: Mack W. Hunt, Ponca City, Okla.

[73] Assignee: Continental Oil Company, Ponca City, Okla.

[22] Filed: Mar. 15, 1971

[21] Appl. No.: 124,592

Related U.S. Application Data

[63] Continuation-in-part of Ser. No. 727,719, May 8, 1968, abandoned.

[52] U.S. Cl............ 252/32.7 HC, 252/33, 252/33.4, 252/39, 252/389
[51] Int. Cl..... C10m 5/24, C10m 5/22, C10m 7/44
[58] Field of Search............ 252/33, 33.4, 32.7 HC, 252/39, 389

[56] References Cited
UNITED STATES PATENTS

| 3,242,079 | 3/1966 | McMillen............................ 252/33 |
|---|---|---|
| 3,429,811 | 2/1969 | Robbins et al........................ 252/33 |
| 3,671,012 | 6/1972 | Scott et al............................ 252/34 |

*Primary Examiner*—Daniel E. Wyman
*Assistant Examiner*—J. Vaughn
*Attorney, Agent, or Firm*—Bayless E. Rutherford, Jr.

[57] ABSTRACT

Method of preparing highly basic, metal containing grease and rust inhibiting compositions which is carried out by (1) forming an admixture of an oil-soluble dispersing agent, an alcohol, water, and an alkaline earth metal oxide, hydroxide or lower alkoxide; (2) carbonating the admixture to form the alkaline earth metal carbonate; and (3) heating the mixture in a controlled manner to effect a modification reaction in which the grease or rust inhibiting composition is formed as evidenced by a rapid change in the viscosity of the mixture. In an alternative embodiment of the method the water is added after the carbonation step and prior to the heating step.

47 Claims, No Drawings

METHOD FOR PREPARING HIGHLY BASIC GREASE AND RUST INHIBITING COMPOSITIONS

CROSS-REFERENCE TO RELATED APPLICATIONS

The present application is a continuation-in-part of U.S. Pat. application Ser. No. 727,719, filed May 8, 1968 and now abandoned.

BACKGROUND OF THE INVENTION

1. Field of the Invention

This invention relates to methods of preparing greases and rust inhibiting compositions, and more specifically, to an improved method for preparing compositions having a high basicity and high consistency, and which can be used as either a high viscosity grease, or, as a rust inhibitor, depending on whether a non-volatile oil or a volatile solvent is used as a base or carrier for the composition.

2. Brief Description of the Prior Art

Grease and rust inhibitor compositions having improved properties for many uses, and particularly, for rust proofing automobile underbodies, are described in U.S. Pat. Nos. 3,242,079 and 3,372,115 to McMillen. These products are characterized in having high viscosity, good salt spray and water corrosion resistance, good thermal stability at high temperatures, and other valuable properties described in the patent. The method of preparation of the grease and rust inhibitor compositions disclosed in the McMillen patents may be broadly described as essentially a two-step procedure. In this method of preparation, a homogeneous solution or collodial dispersion of a basic metal compound is initially formed and filtered and this solution or dispersion is then treated with a water-alcohol mixture (or active hydrogen compound), preferably at elevated temperatures, to yield the desired grease products. Moreover, each of the aforementioned patents teaches that the amount of water-alcohol mixture (or active hydrogen compound) required for conversion of the colloidal dispersion of basic metal compound to the grease is from about 1 percent to about 80 percent based on the weight of the colloidal dispersion of basic metal compound.

Brief Summary of the Present Invention

Broadly stated, the present invention concerns a method of preparing a composition of matter, which is particularly suitable as a rust inhibitor and as a grease, wherein the method comprises (1) forming an admixture of an oil-soluble dispersing agent nonvolatile carrier material, an alcohol, water and an alkaline earth metal oxide, hydroxide, or lower alkoxide, (2) carbonating the admixture to form the alkaline earth metal carbonate and (3) heating the carbonated admixture in a controlled manner to effect a modification reaction in which the desired composition is formed as made evident by a rapid change in the viscosity of the mixture. In an alternative embodiment of the method the water is added after the carbonation step and prior to the modification heating step.

In a more specific embodiment of my invention, the method comprises the steps of:

A. forming an admixture consisting essentially of:
  a. oil-soluble dispersing agent,
  b. non-volatile carrier material,
  c. water,
  d. a $C_1$–$C_3$ alkanol, and
  e. an alkaline earth method oxide, hydroxide or $C_1$–$C_3$ alkoxide, said admixture being characterized further in that the amount of water is from about 0.25 to about 5 moles per mole of overbasing alkaline earth metal, B. carbonating the admixture of step (A) to the extent that at least 1.5 moles of carbon dioxide, per mole of alkaline earth metal, are present in the admixture, while maintaining the admixture at a temperature below about 75° C., C. heating the carbonated admixture to a temperature of above 100° C., said heating step being characterized in that the time required to heat to 100° C. requires from about 0.5 to about 8 hours.

A second specific embodiment of my invention comprises the steps of:

A. forming an admixture consisting essentially of:
  1. oil-soluble dispersing agent,
  2. non-volatile carrier material, and
  3. a $C_1$–$C_3$ alkanol, B. adding to the admixture of step (A) an alkaline earth metal oxide, hydroxide, or $C_1$–$C_3$ alkoxide, C. carbonating the admixture of step (B) to the extent that at least 1.5 moles of carbon dioxide, per mole of alkaline earth metal are present in the admixture, while maintaining the admixture at a temperature below about 50° C., D. adding to the carbonated admixture of step (C) from about 0.25 to about 5 moles of water per mole of overbasing alkaline earth metal present, while maintaining the admixture at a temperature below about 70° C., E. heating the admixture of step (D) to a temperature above 100° C., said heating step being characterized in that the time required to heat to 100° C. requires from about 0.5 to about 8 hours.

Optionally, the admixture of step (A) in both embodiments can contain a volatile processing solvent.

Each of the embodiments described hereinbefore can have the additional step of heating the final product to remove a portion or all of the volatile materials present.

Certain conditions are critical in the operation of the method to insure preparation of a satisfactory product, particularly under large-scale or commercial size operations. The critical conditions will be discussed in the detailed description of amounts of materials and process conditions.

DETAILED DESCRIPTION OF PREFERRED EMBODIMENTS OF THE INVENTION

Starting Materials

The amounts of the materials used in the method of the present invention are set forth below, expressed as weight percentages:

| Material | Suitable | Preferred | Most Preferred |
| --- | --- | --- | --- |
| Dispersing Agent | 2–65 | 6–8 | 7 |
| Volatile Processing Solvent | 0–60 | 25–45 | 25–45 |
| Non-Volatile Carrier Material | 5–80 | 10–30 | 10–30 |

-Continued

| Material | Suitable | Preferred | Most Preferred |
|---|---|---|---|
| Alkaline Earth Metal Basic Compound (Expressed in Alkaline Earth Metal Content) | 2–10<br>1–9 | 4–8<br>3–7 | 5 |
| Water | 1–6 | 2–4 | 3 |
| Alcohol | 10–40 | 20–30 | 30 |

The weight per cent ranges of water and alkaline earth metal basic compound are interdependent, and a more definitive statement of the amounts of these materials used in the mixture includes an identification of the correlation between the amount of water used, and the amount of alkaline earth metal basic compound present. This parameter is more fully described hereinafter.

It may be well to state at this time that in both the preferred and most preferred ranges described in the table the combined amount of water and alcohol is greater than 80 percent of the combined amount of the dispersing agent and overbased alkaline earth metal basic compound, even after the alkaline earth metal basic compound has been converted to the carbonate.

A wide variety of non-volatile carrier materials are suitable for use in the starting material mixtures. The principal property desired in the carrier material is that it will act as a solvent for the dispersing agent. It is also desirable that it will reduce the tackiness and the water emulsifiability of the final compositions when a rust and corrosion inhibiting application is intended. It is further highly preferred that the non-volatile carrier material have an initial boiling point lower than 230°C. Examples of non-volatile carrier materials which can be used include mineral lubricating oils obtained by conventional refining procedures; synthetic lubricating oil, such as polymers of propylene, polyoxyalkalenes, polyoxypropylene; dicarboxylic acid esters, and esters of acids of phosphorus; synthetic hydrocarbon lubricating oils, such as di-n-alkyl-benzenes and oligomers of $C_8$–$C_{14}$ α-olefins; vegetable oils, such as corn oil, cottonseed oil, and caster oil; animal oils, such as lard oil and sperm oil; synthetic waxes and natural waxes, such as paraffin wax and microwax, both finished and crude. Mixtures of these materials may also be employed as the carrier material.

Of the preceding examples of non-volatile diluent materials, the mineral lubricating oils, the synthetic lubricating oils and the petroleum waxes are considered more suitable. Where a rust or corrosion inhibiting end use is contemplated, the petroleum waxes are preferred, with microcrystalline waxes being most preferred.

Although I have used the term "non-volatile carrier material" herein, other terms can and have been used elsewhere to describe these particular components of the starting material mixtures used in the process of this invention. For example, the terms "diluent oil" and "non-volatile diluent oil" have been used.

A variety of oil-soluble dispersing agents are suitable in the mixtures which are used in preparing the grease and rust inhibitor compositions of the present invention. Generic examples of suitable dispersing agents include oil-soluble metal salts of sulfonic acids, carboxylic acids and phosphorus sulfide-treated olefins. The preferred dispersing agents are the oil-soluble metal salts of sulfonic acids and carboxylic acids, and the most suitable general category of dispersing agents are the metal salts derived from sulfonic acids.

The term "metal" as used in "metal sulfonates," refers to those metals which are conventionally used to prepare the metal sulfonates of commerce. This includes metal sulfonates wherein the metal is sodium, potassium, magnesium, calcium, strontium and barium. The more suitable sulfonates useful as dispersing agents in the invention are those wherein the metal is calcium, magnesium, barium, or strontium. In most cases, the metal of the metal sulfonate used as a dispersing agent in the process of the invention is the same as the metal of the alkaline earth metal-carbonate complex used in the starting mixture.

The term "oil-soluble sulfonates," as used herein, refers to those sulfonates wherein the hydrocarbon portion of the molecule has a molecular weight in the range of about 300 to about 1,000. Preferably, this molecular weight is in the range of about 370 to about 700. These oil-soluble sulfonates can be either synthetic sulfonates or the so-called mahogany or natural sulfonates. The term "mahogany sulfonates" is believed to be well understood, since it is amply described in the literature. The term "synthetic sulfonates" refers to those sulfonates which are derived from sulfonation feedstocks which are prepared synthetically. The synthetic sulfonates include alkyl sulfonates and alkaryl sulfonates. They also include materials having cycloalkyl (i.e., naphthenic) groups in the side chains attached to the benzene ring. The alkyl groups can be either straight or branched chain. The alkaryl radical can be derived from benzene, toluene, ethyl benzene, xylene isomers, or naphthalene.

An example of an oil-soluble alkaryl sulfonate (a synthetic sulfonate) which has been particularly useful in preparing admixtures of the type used as a dispersing agent in the starting material mixtures of the invention is the material known as postdodecylbenzene sulfonate. Postdodecylbenzene sulfonate is a bottoms product of the manufacture of dodecylbenzene. The alkyl groups of postdodecylbenzene are branched chain. Postdodecylbenzene consists of monoalkyl benzene and dialkyl benzene in the approximate mole ratio of 2:3 and has typical properties as follows:

| | | |
|---|---|---|
| Specific gravity at 38°C. | | 0.8649 |
| Average molecular weight | | 385 |
| Per cent sulfonatable | | 88 |
| A.S.T.M. D-158 Engler: | | |
| I.B.P., | °F. | 647 |
| 5 | °F. | 682 |
| 50 | °F | 715 |
| 90 | °F. | 760 |
| 95 | °F. | 775 |
| F.B.P. | °F | 779 |
| Refractive index at 23°C. | | 1.4900 |
| Viscosity at: | | |
| −10°C., | centipoises | 2800 |
| 20 | do. | 280 |
| 40 | do. | 78 |
| 80 | do. | 18 |
| Aniline point, °C. | | 69 |
| Pour Point, °F. | | −25 |

An example of another oil-soluble synthetic alkaryl sulfonate which is particularly useful in the invention is the sulfonate derived from a sulfonation feedstock known as "dimer alkylate." "Dimer alkylate" has branched-chain alkyl groups as does postdodecylbenzene. However, "dimer alkylate" is predominantly a monoalkylbenzene. Briefly described, dimer alkylate is prepared by the following steps:

1. dimerization of a suitable feedstock, such as cat poly gasoline,
2. alkylation of an aromatic hydrocarbon with a dimer formed in step (1).

Preferably, the dimerization step uses a Friedel-Crafts alkylation sludge as the catalyst. This process and the resulting product are described in U.S. Pat. No. 3,410,925.

An example of still another oil-soluble synthetic alkaryl sulfonate having utility in the invention, particularly when mixed with at least 60 weight per cent of one of the sulfonates mentioned above, is the sulfonate derived from a sulfonation feedstock which I refer to as "NAB Bottoms." NAB Bottoms or stripped "N-Alkylene" Bottoms are predominantly di-n-alkaryl, wherein the alkyl groups contain from 8 to 18 carbon atoms. They distinguish primarily from the preceding sulfonation feedstocks in that they are straight-chain and contain a large amount of disubstituted material. These materials are described more completely in U.S. Pat. application U.S. Ser. No. 62,211 now Pat. No. 3,764,533, filed Aug. 7, 1970, and being a continuation-in-part of U.S. Pat. application Ser. No. 529,284, filed Feb. 23, 1966 and now abandoned, each of said applications having the same assignee as the present application. A process of preparing these materials is described in U.S. Pat. application Ser. No. 53,352 now U.S. Pat. No. 3,662,012, filed Aug. 6, 1970, and having the same assignee as the present application. U.S. Pat. application Ser. No. 53,352 is a continuation-in-part of U.S. Pat. application Ser. No. 529,284. Another process of preparing a di-n-alkaryl product is described in U.S. Pat. application Ser. No. 104,776, filed Jan. 7, 1971 which is a continuation-in-part of U.S. Pat. application Ser. No. 521,794, filed Jan. 20, 1966 and now abandoned, each of said applications having the same assignee as the present application.

In order to make my disclosure even more complete U.S. Pat. No. 3,410,925 and U.S. Pat. application Ser. Nos. 53,352, 62,211 and 104,776, which is a continuation-in-part of U.S. Pat. Ser. No. 521,794, are made a part of this disclosure.

Other sulfonates which can be used in the admixture employed as a starting material include, for example, mono-and poly-wax substituted naphthalene sulfonates, dinonyl naphthalene sulfonates, diphenyl ether sulfonates, naphthalene disulfide sulfonates, diphenyl amine sulfonates, dicetyl thianthrene sulfonates, dilauryl betanaphthol sulfonates, dicapryl nitro-naphthalene sulfonates, unsaturated paraffin wax sulfonates, hydroxy substituted paraffin wax sulfonates, tetraamylene sulfonates, mono- and poly-chlorosubstituted paraffin wax sulfonates, nitrosoparaffin wax sulfonates; cycloaliphatic sulfonates, such as lauryl-cyclohexyl sulfonates, mono- and poly-wax substituted cyclohexyl sulfonates, and the like.

In addition, it is to be understood that the metal salts of the preceding sulfonates can be formed in situ during preparation of the admixture by neutralization of the corresponding sulfonic acid. Products containing a different metal sulfonate than the complex can be prepared by neutralization before addition of the alkaline earth metal salt or metal complex.

Suitable carboxylic acids which can be used in preparing the starting material include naphthenic acids, such as the substituted cyclophentane monocarboxylic acids, the substituted cyclohexane monocarboxylic acids and the substituted aliphatic polycyclic monocarboxylic acids containing at least 15 carbon atoms. Specific examples include cetyl cyclohexane carboxylic acids, dioctyl cyclopentane carboxylic acids, dilauryl decahydronaphthalene and stearyloctahydroindene carboxylic acids and the like and oil-soluble salts thereof. Suitable oil-soluble fatty acids are those containing at least eight carbon atoms. I prefer fatty acids which are liquids at ambient temperatures down to about 15° C. Specific examples include 2-ethyl hexanoic acid, pelargonic acid, oleic acid, palmitoleic acid, linoleic acid and ricinoleic acid. Naturally occurring mixtures of predominantly unsaturated fatty acids, such as tall oil fatty acids, are particularly suitable.

In addition, it is to be understood that the metal salts of the preceding carboxylic acids can be formed in situ during preparation of the admixture by neutralization of the corresponding carboxylic acid.

The phosphorous sulfide-treated olefins (by the term "olefins," I mean to include, also, olefin polymers, e.g., polyisobutylene) and their oil-soluble metal salts which are suitable for use include those customarily used in lubricating oil formulations as corrosion inhibitors and/or detergents. Specifically, they include the potassium-polyisobutylene-phosphorus sulfide products described by U.S. Pat. No. 2,316,080, issued on Apr. 6, 1943, to Loane and Gaynor, and a similar material containing no metal made by addition of a phosphorus sulfide to wax olefins, as described in U.S. Pat. No. 2,516,119, issued on July 25, 1950, to Hersh. This latter preferred material is made by first forming wax olefins from paraffin waxes by halogenation and dehydrohalogenation and subsequently treating the olefins with a phosphorus sulfide, preferably phosphorus pentasulfide. Another teaching of the preparation of phosphorus sulfide-treated olefins is U.S. Pat. No. 2,688,612, issued Sept. 7, 1954, to Watson.

The alkaline earth metal basic compounds in the starting mixture are preferably selected from the group consisting of calcium and barium, with calcium being most preferred. By a carbonation procedure hereinafter described, these compounds are complexed in situ to form an alkaline earth metal-carbonate complex. The amount of alkaline earth metal utilized can vary over a wide range. Since the function of the alkaline earth metal is primarily to impart a reserve alkalinity or basicity to the products, the main consideration in determining the amount of alkaline earth metal basic compound which is incorporated in the mixture is the degree of overbasing or reserve basicity which is desired in the final product. The extent of reserve basicity of the finished product is in turn related to its consistency or thickness. The term "overbasing" is here used in part because of the fact that frequently the same alkaline earth metal hydroxide or oxide which is subsequently carbonated to form the described complex is incorporated in the mixture in sufficient quantities to also effect the in situ formation of the dispersing agent by neutralization of its sulfonic or carboxylic acid precursor. Overbasing is thus an appropriate term used to refer to the imparting of a basic or alkaline character to the admixture or final product by the inclusion therein of a greater amount of the alkaline earth metal basic compound than may be required for acid neutralization purposes. For forming the carbonate complex precursor, it is preferred to include an amount of alkaline earth metal of from about 1 weight per cent to about 25 weight per cent, based on the weight of the final product. Most suitably, from about 2 weight per cent to about 10 weight per cent of the metal is present in the final product as an alkaline earth metal carbonate derived in the manner hereinafter described. It should be noted, however, that the particular amount of alkaline earth metal used in any given instance is subject to consideration of the extent of reserve basicity desired in the product, and also to consideration of the interrelation of such basicity to the concentration of the dispersing agent in the mixture and to the consistency of the product, as more fully hereinafter described. It is preferred that the product compositions have an acetic acid base number of at least 100, and it is very desirable that the basicity be much higher than this.

The amount of alcohol used in the method of the invention does not appear to be critical as long as the total amount of alcohol and water is above 80 per cent, preferably above 100 per cent, of the amount of the carbonated overbased alkaline earth metal salt (e.g., alkaline earth metal sulfonate). The ratio of alcohol to the alkaline earth metal, employed for overbasing purposes, may vary from about 1:1 to about 10:1 on a weight basis. The total quantity of alcohol may be incorporated in the mixture in several separate portions at several times during the making of the composite admixture which is subjected to the grease conversion heating step of the invention. In fully understanding the quantitative and qualitative aspects of the alcohol content of the mixture, it is helpful to describe the role of the alcohol. First, it is a slurrying or carrier material utilized in the formation of the alkaline earth metal complex. In addition, and perhaps most importantly, it is a promoter in the conversion of the mixture to grease by reaction with water.

In forming the alkaline earth metal complex in situ, there is initially incorporated in the mixture, an alcohol slurry of an alkaline earth metal basic compound selected from the group consisting of alkaline earth metal oxides, hydroxides, and alcoholates. The alcohol used in the slurry is a monohydric, lower aliphatic alcohol containing from 1 to 3 carbon atoms, with methanol being preferred. At least enough alcohol is utilized to form a solution of barium basic compounds, where they are used as the source of the alkaline earth metal-carbonate complex, or to form a homogeneous slurry where a calcium compound is utilized. In the latter case, the calcium compound is preferably calcium hydroxide, and a very fine-particled grade, such as "greasemakers lime," is most suitable. The alkaline earth metal basic compounds employed in making up the slurry should not contain more than 5 weight per cent carbonate salts. It may further be pointed out here that its is quite important that the slurry or solution be prepared within a relatively short time (not exceeding four hours) before adding the slurry to the mixture.

Since the quantity of alcohol required to form the precarbonation slurry of alkaline earth metal basic compound is often less than the total quantity required to promote the grease conversion reaction, it is optional whether all of the required alcohol for carrying out the process is incorporated in the mixture at this time, or whether additional alcohol be previously or later introduced to the mixture. The alcohols which are useful for forming the grease are the same as those used to form the slurry or solution of alkaline earth metal compound, described previously; that is, suitable alcohols for forming the grease are the $C_1$–$C_3$ alkanols.

After the alcohol slurry or solution of the alkaline earth metal basic compound is added to the mixture of dispersing agent and non-volatile carrier material, carbonation of the alkaline earth metal to form the carbonate complex is carried out by bubbling $CO_2$ gas through the mixture or, less suitably, can be accomplished by the use of solid carbon dioxide immersed in the mixture. An amount of about 1.5 moles of carbon dioxide is required to complex each mole of the alkaline earth metal available in the mixture for overbasing purposes. The amount of carbon dioxide will be described on a different basis in the later section on Process Conditions, as will be the critical features of the carbonation step.

Satisfactory products can be made using a wide range of amounts of water. In any case, the amount of water included in the composition is related to the number of moles of alkaline earth metal present in an overbasing capacity (that is, in addition to any of this metal which may be used to form the salt used as a dispersing agent), and may range from about 0.25 to about 5 moles of water per mole of the overbasing alkaline earth metal. About 1.5 moles of water per mole of the alkaline earth metal is optimum. Increasing the amount of water over the optimum amount, but within the operative range, appears to cause a slight softening of the grease products which are produced. As stated previously, in one embodiment of the method of my invention the water is added to the initial admixture. In a second embodiment, the water is added after the carbonation step.

As stated previously, the water can be added at different points in the method of my invention. This will be discussed in detail under Process Conditions.

As another ingredient or starting material useful in the practice of the invention, the desirability of including a light or relatively volatile hydrocarbon solvent (preferably having a boiling point below about 220° C.) in the mixture prior to the carbonation step may be mentioned. (This solvent was referred to in the starting materials as a "volatile processing solvent.") The solvent employed for this purpose may be, for example, n-decane, benzene, toluene, or n-hexane. The use of this solvent is not critical, but it is preferable to employ from about 20 weight per cent to about 80 weight per cent, based on the weight of the dispersing agent and non-volatile carrier material present.

In concluding the discussion of the materials used in the practice of the method of the invention, it should be mentioned that whether the ultimate products of the invention enjoy primary utility as greases or as rust inhibiting compositions depends upon the carrier material or inactive base substance in which the active ingredients (dispersing agent and reaction product of water and alkaline earth metal-carbonate complex) are incorporated. A hydrocarbon solvent of relatively high volatility is utilized as a solvent for the thick, reaction product where it is to be applied as a rust or corrosion protective coating or film, and may be incorporated in large part in the starting material. Stoddard solvent is an excellent, though certainly not an exclusive, material for this purpose. This material is a mixture of paraffinic mineral spirits having a boiling range between 155° and 215° C. and an open cup flash point of about 41° C. For rust inhibiting applications, it is preferable to prepare a final liquid composition which contains from about 30 weight per cent to about 70 weight per cent of the hydrocarbon solvent, with about 60 weight per cent being nearly optimum in most cases. Variations in the amount of carrier or base solvent used affect the thickness of protective films or coatings derived therefrom.

Where the product is to be used as a grease, its final consistency or thickness is controlled by using as a base or carrier, a relatively non-volatile mineral oil typically having the general properties of a Bright Stock cut produced in petroleum refining. A portion of this nonvolatile cut-back material may be included in the initial admixture and carried through the carbonation and heating step of the process.

From the foregoing considerations, the suitable and preferred product compositions ultimately appertaining may be tabulated as follows:

| Material | Suitable | Preferred |
| --- | --- | --- |
| Dispersing Agent | 5–65 | 15–30 |
| Product Carrier Solvent | 0–85* | 30–70* |
| Alkaline Earth Metal Carbonate | 5–40 | 8–16 |
| Non-Volatile Carrier Material | 5–80 | 40–60 |

*When the product is to be used as a grease, no product carrier solvent (also called volatile processing solvent elsewhere herein) is present.

The product, in the absence of carrier solvent, has the following characteristics:
1. it is thixotropic,
2. a dropping point of at least 480° F.,
3. does not flow at 210° F.,
4. an acetic base number of at least 50, preferably at least 150. (The term "acetic base number" is to be found in many U.S. patents (e.g. U.S. Pat. No. 3,150,088). The procedure is generally outlined in *Analytical Chemistry*, Vol. 23, No. 2, February, 1951, page 337, and Vol. 24, No. 3, March, 1952, page 519. As used herein, base number refers to milligrams of potassium hydroxide per gram of sample.)

I have found a significant relation to exist between the amount of dispersing agent in the heated admixture, and the consistency or penetration value of the product, and that an important relation also exists between the amount of alkaline earth metal in the admixture and the penetration value of the product. Thus, decreasing the amount of dispersing agent below about 22 weight per cent of the non-volatile portion of the mixture (that is, the portion boiling above about 230° C. and usually including the dispersing agent, the non-volatile carrier material and the alkaline earth metal carbonate-complex) results in a marked decrease in the consistency of the product (higher penetration value). Similarly, decreasing the amount of alkaline earth metal in the admixture has the effect of decreasing the consistency of the product. Therefore, when a product is to be used as a heavy-duty, all-purpose grease, or as a rust inhibitor, the heated admixture should contain at least 7 weight per cent of the alkaline earth metal complex (based on the non-volatile portion), and most preferably, from about 10 weight per cent to about 15 weight per cent. It is also preferred that the non-volatile portion of the starting admixture contain at least 15 weight per cent of the dispersing agent (based on the non-volatile portion), and preferably at least 22 weight per cent thereof. It is apparent from these considerations that, in order to maintain a required high consistency in the modified product, a decrease in either the amount of the alkaline earth metal-carbonate complex, or in the amount of dispersing agent, requires an increase in the other of the two materials. Products of very low consistency (i.e., a penetration of above about 480) can conceivably be prepared using an amount of alkaline earth metal-carbonate complex, or an amount of dispersing agent, lower than the amounts prescribed in the preceding discussion.

PROCESS CONDITIONS

In carrying out the process of the invention, the oil soluble dispersing agent (whether pre-formed, or formed in situ), non-volatile carrier and alcoholalkaline earth metal basic compound slurrry are intimately admixed preparatory to carbonation. The water component of the mixture may be added at any time prior to the final controlled heating step, and may be added at different times in two or more increments, if desired. The same is true of any alcohol which is used in addition to that introduced with the slurry.

At this time it may be well to provide an explanation as to the different conditions of water addition in the methods of my process.

When the reaction system is under no pressure and when the temperature is maintained below about 35° C., prior to carbonation, the water can be added to the initial admixture.

It has been my experience that in using commercial equipment pressure often develops in the reaction system with the result that the method should be modified. Under such conditions it is better to add the water after the carbonation step.

The pressure in commercial equipment results from the height of the liquid and also from equipment. For example, in the latter case, the vapors must be pushed through a condenser and the liquid in the liquid return line causes a resistance which is overcome by increasing the vapor pressure. Pressure causes a change in the final product. As the pressure is increased the viscosity of the final product decreases. This is due to a change in the crystalline form of the calcium carbonate. The desired form is calcite and the undesirable form is vaterite. As the pressure is increased the amount of vaterite increases and the viscosity decreases. This can be offset by adding the water after carbonation but below about 70° C. (preferably below about 66° C.). If the water is added above about 70° C., again, more vaterite forms and less calcite resulting in a decrease in viscosity.

In carrying out the carbonation of the mixture to form the carbonate complex, at least about 1.5 moles of carbon dioxide must be introduced to the mixture for each mole of alkaline earth metal present. Stated in another manner, the amount of carbon dioxide used is from about 0.95 to about 2.0 moles, preferably from about 1.1 to about 1.3 moles, per mole of overbasing alkaline earth metal present in the admixture.

Previously, (i.e., in the parent application) it was believed that the time of carbonation was critical. This is not the case when the temperature of carbonation is controlled as described hereinafter.

The carbon dioxide required may be introduced into the mixture by blowing or bubbling the gas through the mixture, or by immersing dry ice in the mixture. The reaction is exothermic and its progress can be followed by observation of the change in temperature of the reaction mixture. It is preferred that the temperature be retained below about 50° C. during carbonation, more preferably the temperature is retained below about 40° C. during carbonation.

As stated previously, in one embodiment, upon completion of carbonation, the carbonated admixture is subjected to a heating step. In the second embodiment, upon completion of carbonation, water is added to the admixture prior to the heating step. In both embodiments, the heating step is quite important, and the manner in which it is conducted determines whether the desired high consistency-low penetration greases are yielded, or whether a fluid dispersion of the general type described in U.S. Pat. Nos. 2,956,018 and 2,861,951 to Carlysle and also in U.S. Pat. Nos. 3,150,088 and 3,027,325 to McMillen are formed. Variations from the critical manner of conducting the final heating step may also result in the formation of a thermoplastic substance which, though possessing grease-like properties when initially formed, will become a fluid dispersion upon being heated to a moderately high temperature, and then cannot be reconverted to the grease-like substance upon lowering the temperature.

In the final heating step of the process, two objectives are sought by the heating. First, the light solvents must be stripped from the mixture, except, perhaps, for small amounts of water and alcohol and such light hydrocarbon carrier material as it is desired to have remain in the final product for purposes of enhancing the ease of processing, and for producing a liquid rust inhibiting composition which can be applied, by spraying or painting, to a metal surface to be protected. Thus, the heating will remove substantially all of the alcohol and water which are not consumed in the grease producing reaction, and any very light hydrocarbon solvents, such as hexane, which are incorporated in the mixture in order to facilitate the carbonation of the alkaline earth metal base compound.

The second function of the heating is to supply the heat of reaction which is necessary to effect the conversion of the mixture to a high consistency grease. The mechanism by which such conversion to the viscous, tacky grease product occurs is not thoroughly comprehended, but apparently entails decomposition of the carbonate complex to form alkaline earth metal-carbonate compounds which are homogeneously dispersed in the greasy product. The precise role playeed by the water in this conversion is not known, but its presence is essential and, moreover, it is necessary that a certain minimum amount of the water be present over a certain period of time in order to effect the conversion. It is possible, as will be hereinafter explained in greater detail, to obtain a pseudo-grease product when the final heating step of the process is carried out outside the process limits to be described. Such pseudo-grease resembles the product actually sought by the process of the invention, but differs from the product in having a thermoplastic property which renders it unstable at elevated temperatures—a characteristic which is avoided when the final heating step is carried out in accordance with the invention.

To then describe the specific parameters which are critical in the heating of the heterogeneous mixture which exists after carbonation in order to form the described grease and rust inhibiting compositions, it is necessary that the mixture be heated to a temperature above about 50° C. It is possible, by heating the mixture to a temperature lower than this and removing solvents (e.g., by gas stripping) to eventually produce a thick grease-like substance which resembles in appearance and feel the grease products which it is the object of the invention to produce. These products will, however, upon being heated to relatively high temperatures, say, in excess of about 200° C., soften and become fluid and appear to become a homogeneous dispersion. Returning the product compositions to lower temperatures after such heating results in no change in the composition and, thus, the desired grease properties cannot be restored to the compositions.

After reaching the threshold temperature of about 50° C. for effecting the conversion reaction, it is then desirable to gradually increase the temperature of the reaction mixture to above 100° C., and preferably ultimately to about 160° C. This is because water in the mixture commences to be stripped or driven off at 100° C., and the total processing time becomes unacceptably long when temperatures exceeding this level are never attained during the final heating step. On the other hand, it is critical to the formation of the desired grease products that the temperature zone of 50° to 100° C. not be traversed too rapidly. The effect of increasing the temperature of the mixture at an excessive rate is to drive an excessive amount of the water from the mixture before it has had an opportunity to enter into the reaction necessary to convert the mixture to grease. From this it follows that the greater the amount of water in the mixture within the operative range of water content hereinbefore described, the higher may be the rate at which the temperature is raised from 50° to 100° C.

Described generally, the time of heating, while holding the temperature of the admixture below 100° C., is from about 0.5 to about 8 hours, preferably from about 1 to about 4 hours.

The time requirement can also be expressed mathematically based upon the amount of water present in the admixture. In the discussion below this manner of stating the time requirement is described.

In the examples hereinafter appearing, the relationship between the amount of water in the heated mixture and the time required to traverse the temperature zone of from 50° to 100° C. is presented. It will suffice at this point in the description to note the fact that, where the minimum operative quantity of water is present in the mixture at the inception of the final heating step (that is, 0.25 moles of water per mole of overbasing alkaline earth metal present), the time within which the mixture must be maintained between 50° and 100° C. is at least 4.5 hours. This time period decreases in a fairly regular uniform fashion as the amount of water present in the mixture with respect to the amount of alkaline earth metal present increases. Thus, when a water level of about 2.5 moles of water per mole of alkaline earth metal is reached, a time period of only about 45 minutes in the temperature range of 50° to 100° C. is required in order to effect the desired conversion to the grease product. At this and higher water levels, the time requirement to effect the desired conversion drops off very sharply so that the reaction mixture may be heated from 50° to 100° C. at as rapid rate as may be desired. This relationship between the transition time for elevating the temperature of the reaction mass from 50° to 100° C. in instances where the water content of the reaction mixture is in the range of from about 0.25 moles of water per mole of alkaline earth metal (present in an overbasing capacity) to about 2.5 moles of water per mole of the metal can be approximated by the expression:

$$t = 0.75 + 1.6 \times (2.5 - m)$$

where $t$ equals the time in hours within which the mixture must be retained in the temperature range of between 50° and 100° C., and $m$ is the number of moles of water present in the mixture per mole of alkaline earth metal present in the mixture in an overbasing capacity.

I have found that where the reaction mixture is heated too rapidly to above 100° C., the water appears to be driven from the mixture too fast to permit the completion of reaction. The result then is that there is formed a homogeneous dispersion of alkaline earth metal-carbonate which is quite fluid and is similar to the lubricating oil additives which are yielded by the processes described in U.S. Pat. Nos. 2,956,018 and 2,861,951 to Carlysle and also in U.S. Pat. No. 3,150,088 to Hunt.

The formation of the desired grease product is clearly evidenced by the marked and rapid change in the observable physical properties of the mixture. The most striking change, perhaps, is in the viscosity of the mixture, which increases rapidly as the conversion to grease occurs. The grease product is tacky and opaque and is macroscopically homogeneous. It is highly basic in terms of its acetic acid base number.

As the starting mixture undergoes conversion or modification to yield the grease products, it will often be desirable to add a volatile organic solvent to the mixture in order to maintain its viscosity within a manageable range. Moreover, such solvent addition is further desirable where the product is to be utilized in rust inhibiting applications, since the solution of the product in such solvents enhances the ease and versatility with which the composition can be applied to various surfaces for rust protection. It is sometimes convenient to incorporate a relatively large amount of volatile solvent in the reaction mixture at the outset of the heating step, particularly where the product is to be used as a rust inhibitor. When this is done, the occurrence of the grease forming reaction is still visible, in that the mixture changes from a clear system to a hazy or cloudy system.

Upon completion of the modification heating step, the product may be subjected to a distillation step to remove a portion or all of the volatile materials present. This final distillation step is governed by the end-use of the final product. Where the product is to be used as a grease substantially all of the volatile materials are removed. Where the product is to be used as a rust-inhibitor, since it is often desirable to apply the product in a volatile solvent, little or no heating is required after the modification heating step.

In some instances it may be desirable to add additional volatile solvent to obtain the desired consistency.

A very suitable solvent, when final use as a rust-inhibitor is contemplated, is Stoddard solvent, as described hereinbefore. When used as a rust-inhibitor the amount of Stoddard solvent may vary from about 30 weight per cent to about 85 weight per cent, with about 60 weight per cent being preferred. The amount of the solvent which is utilized is a factor determining the thickness of the coatings or films which may be applied from the cut-back solution of any given grease product which is thus modified.

It should also be pointed out that instead of cutting the products back with a light hydrocarbon solvent for rust or corrosion inhibiting applications, it may be desirable to mix the products with a relatively non-volatile, heavy mineral oil, such as Bright Stock, in order to render it more manageable as a grease. The particular physical properties which are of interest in handling and utilization, and which characterize the final grease and rust inhibiting compositions, can be tailored to meet customer demands by varying the amount of cut-back material utilized in each case.

The following examples of the process of the invention will serve to further clarify and explain the invention.

EXAMPLE 1

A 1-liter three-necked flask was charged with 39 grams of 100 pale oil (that is, a pale oil having a viscosity of 100 S.S.U. at 100° F.), 150 grams of plant prepared mixture of sulfonic acids, 8.3 grams of water, 200 ml. of methyl alcohol, and 100 ml. of hexane. The plant prepared sulfonic acid mixture contained 27 weight per cent of mixed sulfonic acids, 59.9 weight per cent n-hexane, and 13.8 weight per cent of non-volatile mineral oil. The acid mixture was 60 weight per cent oil soluble sulfonic acid prepared from dimer alkylate as hereinbefore described (the latter prepared by alkylation of benzene with a branched dimer of dodecene), and 40 weight per cent of a sulfonic acid derived from the sulfonation of the stripped "N-Alkylene" Bottoms hereinbefore described. The latter sulfonic acids contained about 60 per cent dialkylbenzene sulfonic acid, about 20 per cent diphenylalkane sulfonic acids, and about 15 per cent tetralins. The average molecular weight of the sulfonic acids in the mixture of sulfonic acids was 380.

The mixture in the three-necked flask was stirred vigorously and to the mixture were added 4 grams of calcium hydroxide in order to neutralize the sulfonic acid. After 10 minutes of poststirring, 33.8 grams of calcium hydroxide were added to the mixture for purposes of overbasing and subsequent formation of the carbonate complex.

An excess of carbon dioxide was then added to the mixture by means of a fritted glass tube disposed below the surface of the liquids in the mixture. During introduction of carbon dioxide to the mixture, the temperature was maintained between 20° and 25° C. by means of an ice bath. Upon completion of carbonation, as evidenced by a decrease in the temperature of the reaction mass, and by the mass becoming acidic to α-naphthol benzein indicator, the mixture was then gradually heated to reflux, and refluxing was continued for a period of 2 hours to decompose the calcium-carbon dioxide complex and form the desired grease product. Due to a rapid thickening of the reaction mass, 170 grams of Stoddard solvent was added. Then the major portion of the solvents was removed by heating to 160° C.

The Stoddard solvent solution of the product was slightly thixotropic, and light brown in color with a slight haze. The Stoddard solvent was removed from a portion of the product by the application of heat and vacuum. The residual grease had an A.S.T.M. penetration of 121.

EXAMPLE 2

A mixture identical to that described in Example 1 was charged to a three-necked flask with the exception that 10 grams of water were employed, intead of the 8.3 grams utilized in the reaction mixture of Example 1. Moreover, the 100 ml. of hexane used in the charge mixture of Example 1 were replaced by 170 grams of Stoddard solvent. The procedure of neutralization with calcium hydroxide, followed by further addition of calcium hydroxide for overbasing purposes was carried out in the same manner as in Example 1, and the mixture was carbonated as described in Example 1. The mixture was then heated slowly to reflux and maintained at this temperature for 4-½ hours instead of the 2 hours employed in Example 1.

The product which was formed was divided into to portions and the Stoddard solvent was removed from a portion of the product to yield a grease having an A.S.T.M. penetration of 155.

EXAMPLE 3

A suitable reactor was charged with 328.1 grams of a plant prepared mixture of sulfonic acids, 82.0 grams of 100 pale oil, 27.4 grams of water, and 150 grams of a Bright Stock cut having a viscosity index of 91. The plant prepared sulfonic acid mixture contained 26.3 per cent of mixed sulfonic acids having an average molecular weight of 445, 59.9 per cent hexane, and 13.8 per cent non-volatile mineral oil. The sulfonic acid mixture contained 70 weight per cent of the dimer alkylate sulfonic acid described in Example 1, and 30 weight per cent sulfonic acid derived from stripped "N-Alkylene" Bottoms, as described in Example 1.

The charge material was mixed mechanically, and to the agitated mixture was added a slurry containing 75.6 grams of calcium hydroxide and 174 grams of methyl alcohol. The slurry had been prepared about 2 hours prior to its addition to the reaction mixture, and was added over a five minute period. The temperature of the mixture was then raised to 35° C. and carbonation was begun. During carbonation, the temperature was maintained between 35° and 40° C. After approximately 14 minutes, the mixture underwent some thickening indicative of the formation of the pseudo-grease having thermoplastic properties as hereinbefore described. The total time of carbonation was 20 minutes at a rate of approximately 1.6 liters of the gas per minute. Upon completion of carbonation, the mixture was heated slowly to reflux for about 30 minutes, and the thick material was transferred to a Hobart mixer. The mixture was then again slowly heated to reflux and the solvents were removed by ultimately heating to 325° F. under partial vacuum. Following removal of the light solvents, 150 grams of a Bright Stock material having a viscosity index of 91 were added to the contents of the mixture. Addition of the Bright Stock carrier material yielded 574 grams of a light tan grease having an A.S.T.M. penetration of 287.

EXAMPLE 4

A number of grease preparations were carried out utilizing the same materials and reactants as described in Example 3, but varying the amount of water included in the mixture from that utilized in Example 3. The amount of water there employed was equivalent to 1.5 moles of water per mole of overbasing calcium in the mixture. From the runs carried out varying the water content of the mixture, it was established that about 1.5 moles of water per mole of the alkaline earth metal in the mixture is an optimum water content, and that variations from this amount of water, both above and below the optimum amount, result in a slight softening of the grease as indicated in Table I.

TABLE I

| Moles $H_2O$/Moles Ca | A.S.T.M. Penetration |
|---|---|
| 0.75 | 365 |
| 1.50 | 287 |
| 3.00 | 388 |

EXAMPLE 5

Several grease preparations were carried out varying the amount of alcohol included in the reaction mixture prior to carbonation, but maintaining the amounts of the other materials in the mixture at the level specified in Example 3. The results of these runs, in which the quantity of alcohol was varied, indicated that the amount of alcohol utilized in Example 3 is near the optimum amount, in that addition of more alcohol, or the use of less alcohol appeared, in both instances, to result in an increase in the A.S.T.M. penetration value of the grease product as indicated in Table II.

TABLE II

| Methanol | A.S.T.M. Penetration |
|---|---|
| 174 grams (Example 3) | 287 |
| 88 grams | 305 |
| 308 grams | 332 |

EXAMPLE 6

This example illustrates the effect of incorporating a substantial quantity of light hydrocarbon solvent in the reaction mixture at the outset of the process in order to facilitate the ultimate preparation of a suitable thixotropic rust inhibiting composition which can be applied to metal surfaces as a film or coating.

A 12 liter, three-necked flask was charged with 1,477 grams of a plant prepared sulfonic acid mixture, 388.9 grams of 100 pale oil, 5 grams of tap water, and 2,000 grams of Stoddard solvent. The plant prepared sulfonic acid mixture contained 26.5 weight per cent of the mixed acids having an average molecular weight of 445, 13.0 weight per cent 100 pale oil, and 60.5 per cent hexane. The acid mixture was of the same composition as that described in Example 3. The charge to the 12 liter flask was thoroughly mixed mechanically, and to the mixture was then added a slurry which contained 345 grams of greasemakers lime and 1,587 grams of methyl alcohol. The total admixture was then stirred for about 30 minutes.

Carbonation was then commenced by introducing carbon dioxide to the mixture at the rate of about 10 liters per minute. During carbonation, the following temperature-time relationship was observed:

| Carbonation Rate, Liters/Minute | Carbonation Time, Minutes | Temperature, °C |
| --- | --- | --- |
| 0 | 0 | 29 |
| 10 | 3 | 35 |
| 10 | 5 | 39 |
| 10 | 7 | 43 |
| 10 | 10 | 49.5 |
| 10 | 12 | 52 |
| 5 | 15 | 47 |
| 5 | 17 | 45 |
| 2.5 | 22 | 45 |
| 2.5 | 27 | 40 |

As can be seen from the tabulated data appearing immediately above, carbonation of the mixture was completed in about 12 minutes as shown by the temperature variation. The addition of carbon dioxide at a reduced rate after the temperature peak was reached was for the purpose of assuring complete carbonation.

Upon completion of carbonation, the mixture was post-mixed at 40° C. for a period of one hour, and was then heated to reflux for a period of about 30 minutes. At reflux, the bottom temperature of the mixture was 58° C. The mixture was then cooled to 55° C. and 145 grams of tap water were added over a 15 minute period. Reflux was then resumed for an additional 2 hour period. Finally, the temperature was slowly elevated to 160° C. to remove the lower boiling solvents (methanol, hexane, and water).

The product which was yielded by the described procedure was tested by dipping a metal panel in the mixture at room temperature and then drying the panel over night. The rust inhibiting film which was deposited on the metal was measured and found to be 6.98 mils thick.

EXAMPLE 7

In investigating the effect which the time of water addition has upon the product yielded, several runs were made using the solvent cut-back procedure described in Example 6, and several runs were made using the grease yielding procedure described in Example 3, but in the several collective runs, adding the water to the mixture at various times during the process up to the solvent removal or heating step. In the case of the grease preparations in which a relatively small amount of volatile solvent is included in the charge mixture prior to carbonation, it was found that it is preferable to add the entire amount of water required prior to carbonation, since addition of the water subsequently to carbonation causes a slight softening in the grease product, with penetrations of about 350 being typical. In the case of the solvent cut-back preparation described in Example 6, however, it does not appear that the point at which the water is added to the mixture is particularly material.

EXAMPLE 8

For purposes of comparison of product quality, two solvent cut-back preparations were carried out using the materials and procedure described in Example 6 except in one of these, all of the water was added prior to carbonation, and in the other, one-half of the water was added prior to carbonation and one-half of the water was added after carbonation. Films deposited from the rust inhibiting compositions made in the two runs had thicknesses of 4.85 mils (for the pre-carbonation water addition) and 7.32 mils (for the split addition). To then compare these products with a rust inhibiting composition made by the heretofore known two-step procedure, the identical reactants were utilized in that procedure to produce a rust inhibiting composition. The average film thickness which was obtained from several two-step preparations was 3 mils.

EXAMPLE 9

To a 1-liter, three-necked flask were charged 200 grams of Stoddard solvent, 31.1 grams of 100 pale oil, 1.5 grams of tap water and 155.6 grams of a plant prepared sulfonic acid mixture having a total acidity of 26.5 weight per cent, a total sulfonic acid content of 25.3 weight per cent, and a total non-volatile mineral oil content of 44.2 per cent. The average molecular weight of the sulfonic acids in the mixture, which were indentical in composition to those described in Example 3, was 445. After placement in the flask, the reactant mixture was post-stirred, and to the mixture was added a previously prepared slurry containing 34.5 grams of calcium hydroxide and 158.7 grams of methyl alcohol. This mixture was stirred for a period of 10 minutes and was then carbonated by passing carbon dioxide into the mixture in the ratio of 2 moles of carbon dioxide per mole of overbasing calcium present in the mixture. The rate of addition was such that carbonation was completed in about 20 minutes. The mixture was then heated to reflux for 15 minutes, and an amount of water equivalent to 2.08 moles of water per mole of overbasing calcium present in the mixture was added. Refluxing was then continued for another 15 minutes and the temperature was then slowly elevated from the reflux temperature to 100° C. within a period of about one hour. Solvent removal was continued by continuing to increase the temperature of the mixture to about 160°C. The time required to heat the mixture from 50° to 160° C. was about one hour and 35 minutes. From the resulting product, a film was deposited upon a metal coupon dipped into the product composition which was 3.34 mils in thickness.

EXAMPLE 10

A number of preparations were carried out using the same reactants described in Example 9, except varying the amount of water added to the mixture and, in some instances, adding all of the water to the initial charge in the three-necked flask, instead of adding a major portion following carbonation as described in Example 9. The preparations also involved variations in the time over which the final mixture was heated from 50° to 100°C., and in the total time over which the mixture was heated from 50° C. to the final solvent stripping temperature of 160° C. Table III sets forth the varying amounts of water utilized during the several runs, the varying times utilized to drive the temperature of the reaction mass from 50° to 100° C., and the variation in the thickness of the corrosion or rust inhibiting films obtained when the products derived from the several runs were employed for coating identical metal coupons using the same coating procedure.

TABLE III

| Moles H₂O/Mole Ca | Time 50°C – 100°C | | Time 50°C – 160°C | | Film Thickness, Mils |
|---|---|---|---|---|---|
| 1.41 | 1 hour | 20 min. | 1 hour | 45 min. | 0.23 |
| 2.08 | 1 hour | 15 min. | 1 hour | 50 min. | 3.34 |
| 2.08 | 1 hour | | 1 hour | 15 min. | 0.22 |
| 0.74 | 4 hours | 20 min. | 4 hours | 55 min. | 4.65 |
| 0.74 | 2 hours | 55 min. | 3 hours | 25 min. | 0.25 |
| 2.75 | 1 hour | 3 min. | 1 hour | 18 min. | 0.40 |
| 1.41 | 2 hours | 30 min. | 3 hours | | 8.82 |
| 3.42 | 1 hour | 6 min. | 1 hour | 15 min. | 2.98 |
| 1.41 | 2 hours | 35 min. | 3 hours | 10 min. | 7.82 |
| 1.41 | 1 hour | 50 min. | 2 hours | 13 min. | 0.36 |

Table III clearly indicates that the rate at which the mixture is heated from 50° to 100° C. is a critical parameter, and strikingly affects the consistency of the product yielded as evidenced by the relatively thin films obtained when the heating rate is too high, as contrasted with the much thicker films obtained when the heating rates hereinbefore prescribed for use in the invention are observed.

EXAMPLE 11

In a plant preparation of a rust inhibitor composition using the method of the invention, 3,902 gallons of a plant prepared sulfonic acid mixture of the type described in Example 3 (containing 27 weight per cent of the described blend of sulfonic acids) were charged to a neutralizer vessel and, with stirring, 775 gallons of 100 pale oil and 5,328 gallons of Stoddard solvent were added to the same vessel.

3,900 gallons of methanol were blended for about 45 minutes with 5,900 pounds of greasemakers lime in separate vessels from the acid containing vessel to form a homogeneous slurry. Then 23 gallons of city water were added to the acid-oil-Stoddard mixture, followed by the addition of the lime-methanol slurry to the mixture over a period of about 45 minutes. The mixture was then transferred to a carbonation still, and a liquid $CO_2$ vaporizer was connected to the still. This vaporizer was rated at about 6,000 lbs./hour, which was calculated to provide a carbonation rate sufficient to completely carbonate the mixture well within one hour, if the gas were added at maximum rated output of the vaporizer unit. Cooling water was circulated through internal bundles in the still to prevent the temperature from exceeding 120° F. during carbonation. It was determined that various line restrictions in the system prevented attainment of the maximum rated delivery capacity of the $CO_2$ generator, with the result that carbonation was completed in 79 minutes.

Upon completion of carbonation, the mixture in the still was heated to reflux temperature (about 56° C.), and refluxed for 30 minutes. Refluxing was then terminated, the mixture permitted to cool, and 324 gallons of water were added. Refluxing was then resumed for about one hour, followed by heating gradually to 320° F. to remove the volatile materials. The product mixture was then diluted with Stoddard solvent to yield a 40 weight per cent product-solvent composition. A protective film applied to metal coupons by dipping them in this product and drying was 0.38 mil in thickness. This example thus evidences the poor product obtained when the carbonation time is extended beyond 75 minutes.

EXAMPLE 12

Upon completion of the preparation described in Example 11, a new line, larger and unrestricted, was installed between the liquid $CO_2$ vaporizer and the still. Several tests using the new system indicated that the $CO_2$ delivery rate would be high enough to complete carbonation within one hour.

The neutralizer vessel was charged with 4,750 gallons of a plant prepared sulfonic acid mixture containing 23 weight per cent of the mixed acids utilized in Example 3. Then the vessel was charged with 609 gallons of 100 pale oil, 5,400 gallons of Stoddard solvent, and 23 gallons of water. A lime methanol slurry containing 3,900 gallons of methanol and 5,900 gallons of lime was next added to the mixture in the neutralizer vessel.

One half of the mixture was then transferred to the carbonation still. Carbonation was then commenced and carried out at a rate of 6,000 lbs. per hour. At this rate about 2,400 lbs. of $CO_2$ was used for carbonation, and the following temperature-time relationships were observed in the reaction vessel.

| $CO_2$ Addition Time | Temperature |
|---|---|
| 0 min. | 64°F. |
| 5 min. | 75°F. |
| 10 min | 85°F. |
| 15 min. | 96°F. |
| 20 min. | 110°F. |
| 21 min | 111°F. |
| 22 min. | 109°F. |

The peaking of the temperature at about 21 minutes indicated completion of the carbonation reaction.

Following carbonation, the mixture was heated to reflux for about 45 minutes. After then permitting the mixture to cool, 152 gallons of water were added. Reflux was then resumed for about 30 minutes. Distillation to remove solvents was then commenced, and the temperature elevated slowly to 315° F. At about 200° F., an additional 160 gallons of water were added to the mixture. The finished product gave a film thickness of 7.9 mils. 1,200 gallons of Stoddard solvent were then added to the product to give a cut-back rust inhibitor composition from which films having a thickness of 3.5 mils could be deposited on metal surfaces.

EXAMPLE 13

This example and Example 14 illustrate the effect of the temperature at the time of adding the water when the reaction system is under a slight pressure.

The ratio of water-alcohol used, to the carbonated, overbased calcium sulfonate, was 167 percent, on a weight basis.

| Materials | | |
|---|---|---|
| Sulfonic acid* | 1500 | grams |
| Methanol | 1500 | grams |
| 100 pale oil | 67.5 | grams |
| Stoddard solvent | 1000 | grams |
| Calcium hydroxide** | 345.4 | grams |
| Water | 138.5 | grams |

*A hexane solution of sulfonic acids prepared by sulfonation of a mixture of 70 per cent "dimet alkylate" and 30 per cent stripped "NAB Bottoms". The material had the following analysis:

| | | |
|---|---|---|
| Total acidity | = | 0.513 meq./g. |
| Sulfonic acidity | = | 0.604 meq./g. |
| Sulfonic acid, % | = | 27.47 |
| Combining weight (as acid) | = | 455 |
| Nonvolatiles, % | = | 30.7 |
| Oil, % | = | 3.23 |

**Greasemaker's lime.

PROCESS

To a 12-liter, 3-neck, creased flask adapted to a closed system (i.e., 2–3 psig back pressure) were added the sulfonic acid, methanol, pale oil, and Stoddard solvent. The mixture in the flask was then agitated well and the calcium hydroxide was added over a 30 minute period. Upon completion of the addition of the calcium hydroxide, the admixture was cooled to 23° C. and carbonated over a two hour period while maintaining the temperature in the range of 23°–36.5° C. The amount of $CO_2$ added was at a rate of about 943 cc per minute. (Total amount of $CO_2$ = 222 grams) Following carbonation the admixture was cooled to 33° C. The water was added over a 10 minute period, while maintaining the temperature at 32°–34° C. The carbonated admixture was then heated slowly under carefully controlled conditions. The time-temperature profile with the resulting appearance of the admixture are shown below.

| Time | Temperature | Remarks |
|---|---|---|
| 0 | 34.0°C. | Start distillation. Very thick and very little movement. |
| 15 | 46.0°C. | Very viscous. Slow movement. |
| 30 | 58.0°C. | Rapid overhead (begin to fluidize). |
| 60 | 62.0°C. | Rapid overhead (semi-fluid). |
| 75 | 64.0°C. | Thickening slightly. |
| 105 | 67.0°C. | Creamy—more fluid. |
| 135 | 71.0°C. | Creamy. |
| 150 | 71.0°C. | Creamy. |
| 165 | 71.0°C. | Light and fluid. |
| 195 | 74.0°C. | Thickening. |
| 200 | 80.0°C. | Thick and creamy—reduce pressure add 500 grams Stoddard solvent. |
| 205 | 80.0°C. | Semi-fluid—distilling atmospheric condition. |
| 225 | 100.0°C. | Same. No change. |
| 255 | 150.0°C. | Heat off. |

The yield of product was 2,150 grams. 266 grams of Stoddard solvent were added to bring the total weight to 2,460 grams and to adjust the concentration of nonvolatiles to about 40 per cent. The nonvolatile portion of the composition had the following analysis:

| | |
|---|---|
| Calcium sulfonate | 44.42% |
| Calcium carbonate | 43.58% |
| Nonvolatile diluent oil | 12.00% |

The product (40 per cent nonvolatiles in solvent) had a Brookfield viscosity (at 77° F., number 3 spindle, 12 r.p.m.) of 3,338 cps.

EXAMPLE 14

This example is similar to Example 13 with the exception that the water was added at 65° C.

MATERIALS

Same as in Example 13.

PROCESS

The process was the same as in Example 13 down through the carbonation step. At the end of the carbonation step the carbonated admixture was heated from 32° to 65° C. over a period of 100 minutes. At 65° C. the water was added over a 10 minute time period. The admixture was then heated under carefully controlled conditions. The time-temperature profile and the appearance of the product are shown below.

| Time | Temperature | Remarks |
|---|---|---|
| 0 | 65.0°C. | Started $H_2O$ addition (138.5 grams) |
| 5 | 65.0°C. | ½ $H_2O$ added. Very viscous and dark. |
| 10 | 66.0°C. | Finish $H_2O$ addition, more fluid and dark color |
| 20 | 68.0°C. | Dark and creamy material. |
| 30 | 69.5°C. | Same. No change. |
| 40 | 71.0°C. | Dark and creamy. Slight thickening (stirs easily). |
| 55 | 72.5°C. | Dark and creamy. More viscous—still stirs easily. |
| 65 | 70.0°C. | Had to empty receiver for overhead (loss of some pressure). |
| 80 | 72.5°C. | Thickening, lost splashing. |
| 90 | 74.0°C. | Very thick—still some movement. |
| 105 | 76.5°C. | Lost all movement—very thick. |
| 110 | 80.0°C. | Reduced pressure—no movement—solid |
| 125 | 80.0°C. | Added ~300 cc Stoddard solvent. |
| 130 | 80.0°C. | 70 volts heat. 2 "Variacs" to control heat. |
| 150 | 93.0°C. | Viscous, material clinging to flask top. |
| 160 | 114.0°C. | Viscous, some charring to flask. |
| 170 | 130.0°C. | Same. No change. |
| 180 | 148.0°C | Cut heat (and cooled for blending). |

The yield of product was 2,154 grams. 262 grams of Stoddard solvent were added to adjust the nonvolatile portion to about 40 per cent. The nonvolatile portion had the same composition as that in Example 13. The product (i.e., 40 per cent nonvolatiles in Stoddard solvent) had a Brookfield viscosity (at 77° F., number 4 spindle, 12 r.p.m.) of 34,750 cps.

This example was compared to Example 13 clearly shows that adding the water at 65° C. instead of at 32°–34° C. in a closed system results in a substantial increase in the viscosity of the product.

EXAMPLE 15

This example illustrates the effect of adding the water at about 32° C. in a reaction system under no back pressure.

The ratio of water-alcohol employed based on the carbonated overbased calcium sulfonate was 180 per cent.

| Materials | | |
|---|---|---|
| Sulfonic acid "A"* | 1376 | grams |
| Sulfonic acid "B"** | 550 | grams |
| Methanol | 1860 | grams |
| Stoddard solvent | 1421 | grams |
| Calcium hydroxide*** | 413.5 | grams |

*This acid was a hexane solution of sulfonic acids prepared by the sulfonation of dimer alkylate. The acid solution had the following analysis:

| | | | |
|---|---|---|---|
| Total acidity | = | 0.586 | meq./g. |
| Sulfonic acidity | = | 0.544 | meq./g. |
| Combining weight (as acid) | = | 462 | |
| Nonvolatiles, per cent | = | 34.8 | |
| Oil, per cent | = | 9.63 | |

**This acid was a hexane solution of sulfonic acids prepared by the sulfonation of stripped "NAB Bottoms". It had the following analysis:

| | | | |
|---|---|---|---|
| Total acidity | = | 0.565 | meq./g. |
| Sulfonic acidity | = | 0.587 | meq./g. |
| Sulfonic acid, per cent | = | 25.82 | |
| Combining weight (as acid) | = | 440 | |
| Nonvolatiles, per cent | = | 37 | |
| Oil, per cent | = | 11.17 | |

***Greasemaker's lime.

PROCESS

The hexane solutions of sulfonic acids, methanol and Stoddad solvent were added to a 12-liter flask. After mixing the materials in the flask the calcium hydroxide was added over a 15 minute period. The admixture was then carbonated by blowing with $CO_2$ (total amount 266.3 grams). The carbonation was conducted over a period of 130 minutes while maintaining the temperature at a temperature of 23°–35° C. After completion of carbonation the carbonated admixture was cooled to 31.8° C. whereupon the water was added over a 15 minute period. The temperature during the water addition was maintained between 31.4° and 31.8° C. Following the addition of water the carbonated admixture was heated for 150 minutes while maintaining the temperature in the range of 41°–71.5° C. At the end of 150 minutes of the controlled heating period the admixture was quite viscous. 500 grams of Stoddard solvent were added to reduce the viscosity. Heating of the admixture was then continued to a temperature of 150° C. The yield of product was 20,774 grams. Additional Stoddard solvent was added to being the total weight to 3,000 grams. The final product contained about 40 per cent nonvolatiles and had a Brookfield viscosity (at 77° F., number 4 spindle, 12 r.p.m.) of 30,933 cps.

EXAMPLE 16

This example is similar to Example 15 in that the temperature of the water addition was 31°–32° C. It differed from Example 15 in that it was conducted under a slight pressure. The amounts of materials used were the same as in Example 15. The yield of product was 2,556 grams. This was adjusted to 2,900 grams by the addition of Stoddard solvent. The product (about 40 per cent non-volatiles) had a Brookfield viscosity (77° F., number 4 spindle, 12 r.p.m.) of 900 cps.

EXAMPLE 17

This example is similar to Example 16 in that it was done under a slight pressure. It differed from Example 16 in that the water was added at 63°–64.5° C. The materials used were the same as in Examples 15 and 16. Other than the temperature of water addition the procedure was essentially the same as in Example 16. The yield of product was 2,700 grams. This was adjusted to 3,000 grams by the addition of Stoddard solvent. The product (about 40 per cent nonvolatiles) had a Brookfield viscosity (77° F., number 4 spindle, 12 r.p.m.) of 43,000 cps.

EXAMPLE 18

This example shows the results of three plant runs. The materials were the same in the runs. The major differences in the runs was the temperature of the addition of the water and the time of heating in the range of 100°–180° F. (38°–82° C.). The procedure was substantially the same as that shown in Examples 13–17 in that the water was added after the carbonation step.

The ratio of water-alcohol employed, based on the carbonated overbased calcium sulfonate, was 170 percent.

The amounts of materials, the process conditions and the properties of the resulting product are shown in the table below.

| Run No. | 1 | 2 | 3 |
|---|---|---|---|
| Materials Used (in order shown) | | | |
| Hexane-Sulfonic Acid*, gallons | 1282 | 1282 | 1282 |
| 100 Pale Oil, gallons | 15 | 15 | 15 |
| Methanol, gallons | 1171 | 1171 | 1171 |
| Stoddard solvent, gallons | 750 | 900 | 750 |
| Mississippi Lime, lbs. | 1750 | 1650 | 1700 |
| Added at 75–100°F: | | | |
| $CO_2$, lbs.[1] | 1140 | 1110 | 1110 |
| Addition Time, minutes | 120 | 125 | 120 |
| Water Added, gallons | 82 | 82 | 82 |
| Addition Temp., °F. | 147–150[2] | 160–165[3] | 149[4] |
| Stoddard solvent added, gallons | 312 | 162 | 250 |
| Addition Temp., °F. | 160 | 180 | 164 |
| Distillation Times: | | | |
| 100–150°F.[5] | 110 mins. | 100 mins. | 150 mins. |
| 100–180°F.[6] | 12 hours | 220 mins. | 7 hours |
| To Finished Product, hours | 18 hours | 12 hours | 15 hours |
| Final Product: | | | |
| Wt. % Nonvolatiles | 50.06 | 49.90 | 56.40 |

| Run No. | 1 | 2 | 3 |
|---|---|---|---|
| Brookfield Viscosity, cps. (77°F. No. 4 spindle, 12 r.p.m.) | 75,500 | 5,260 | 55,500 |
| Viscosity at 40% Nonvolatiles | 19,000 | | 13,000 |
| Wt. % H₂O | 0.58 | | 0.4 |
| Remarks | Good Product | High Water Temp. (Poor Product) | Good Product |

*Sulfonic acid analysis:

| Feedstock 70% dimer alkylate/30% "NAB Bottoms" | |
|---|---|
| Total Acidity, wt. % | 27.55 |
| Sulfonic Acidity, wt. % | 25.70 |
| Nonvolatiles, wt. % | 34.00 |
| (Calculated) Oil, wt. % | 8.30 |
| (Assumed) Combining Wt. | 460 as Acid |
| Density, lbs./gallons | 6.244 |

(1) 23.9–37.8°C.
(2) 63.9–65.6°C.
(3) 71.1–73.9°C.
(4) 65°C.
(5) 37.8–65.6°C.
(6) 37.8–82.2°C.

From the foregoing description of the invention, it will have become apparent that the present invention provides a highly useful and improved process for preparing viscous, highly basic, metal containing compositions which are excellent greases, and when cut back with a suitable relatively volatile hydrocarbon solvent form thixotropic compositions useful for developing protective films and coatings on metal surfaces. Although certain preferred embodiments of the invention have been herein described in order to provide examples to those skilled in the art which will enable them to practice the invention, it is to be understood that various changes and innovations in the process parameters identified, as well as in the character and amounts of materials utilized in the described embodiments of the invention, can be effected without departure from the basic principles underlying the invention. Modifications and changes of this type are therefore deemed to be circumscribed by the spirit and scope of the invention except as the same may be necessarily limited by the appended claims or reasonable equivalents thereof.

What is claimed is:

1. A method of preparing a composition of matter, which is particularly suitable as a rust inhibitor and as a grease and has the following properties:
   1. it is thixotropic,
   2. a dropping point of at least 480° F.,
   3. does not flow at 210° F.,
   4. an acetic base number of at least 50, said method comprising:
      A. forming an admixture consisting essentially of:

1. from about 2 weight per cent to about 65 weight per cent of an oil-soluble dispersing agent,
      2. from about 5 weight per cent to about 80 weight per cent of a nonvolatile carrier material,
      3. from about 10 weight per cent to about 40 weight per cent of a C₁–C₃ alkanol,
      4. from about 1 weight per cent to about 6 weight per cent water,
      5. from about 2 weight per cent to about 10 weight per cent of an alkaline earth metal oxide, hydroxide or C₁–C₃ alkoxide, said admixture being characterized further in that the amount of water is from about 0.25 to about 5 moles per mole of alkaline earth metal;
      B. carbonating the admixture of step (A), while maintaining the temperature below about 50° C., to the extent that at least 1.5 moles of carbon dioxide per mole of alkaline earth metal are present in the admixture; and
      C. heating the carbonated admixture to a temperature of above 100° C., said heating step being characterized in that the time required to heat to 100° C. is from about 0.5 to about 8 hours; said method being characterized further in that alternatively the water of step (A) is added after step (B) and prior to step (C).

2. A method of preparing a composition of matter, which is particularly suitable as a rust inhibitor and as a grease and has the following properties:
   1. it is thixotropic,
   2. a dropping point of at least 480° F.,
   3. does not flow at 210° F.,
   4. an acetic base number of at least 50, said method comprising:
      A. forming an admixture consisting essentially of:

1. from about 2 weight per cent to about 65 weight per cent of an oil-soluble dispersing agent selected from the group consisting of oil-soluble hydrocarbyl sulfonic acids, oil-soluble carboxylic acids and oil-soluble phosphorous-sulfide treated olefins and alkaline earth metal salts of said sulfonic acids, carboxylic acids, or phosphorous-sulfide treated olefins,
      2. from about 5 weight per cent to about 80 weight per cent of a nonvolatile carrier material selected from the group consisting of mineral lubricating oils, synthetic lubricating oils, animal oils, vegetable oils, and petroleum waxes,
      3. from about 1 weight per cent to about 6 weight per cent water,
      4. from about 10 weight per cent to about 40 weight per cent of a C₁–C₃ alkanol,
      5. from about 2 to about 10 weight per cent of an alkaline earth metal oxide, hydroxide or C₁–C₃ alkoxide, said admixture being characterized further in that the amount of water is from about 0.25 to about 5 moles per mole of overbasing alkaline earth metal,

B. carbonating the admixture of step (A), while maintaining the temperature below about 50° C., to the extent that at least 1.5 moles of carbon dioxide, per mole of alkaline earth metal, are present in the admixture, and C. heating the carbonated admixture to a temperature above 100° C, said heating step being characterized in that the temperature range of from about 50° C. to about 100° C. requires a time period in hours, $t$, as determined by the expression $t = 0.75 + 1.6 (2.5-m)$, wherein $m$ is the ratio of moles of water to moles of alkaline earth metal present as the carbonate in step (B), said time period being characterized further as being in the range of from about 0.5 to about 8 hours.

3. The method of claim 2 wherein (a) the alkanol of step (A) (4) is methanol and (b) the alkaline earth metal alkoxide of step (A) (5) is an alkaline earth metal methoxide.

4. The method of claim 3 wherein the admixture of step (A) contains from about 0.25 to about 2.5 moles of water per mole of alkaline earth metal.

5. The method of claim 4 wherein the amount of alkaline earth metal oxide, hydroxide or alkoxide of step (A) (5) is sufficient to provide an acetic base number of at least 100 in the final product.

6. The method of claim 5 wherein the alkaline earth metal is calcium or magnesium.

7. The method of claim 6 wherein the oil-soluble dispersing agent is a calcium or magnesium salt of a hydrocarbyl sulfonic acid.

8. The method of claim 7 wherein the alkaline earth metal is calcium and the oil-soluble dispersing agent is a calcium hydrocarbyl sulfonic acid.

9. The method of claim 8 wherein the temperature during the carbonation is maintained below about 40° C.

10. The method of claim 9 wherein the admixture of step (A) contains additionally from about 20 to about 80 weight per cent of a volatile hydrocarbon solvent, having a boiling point below about 220° C., based on the combined weight of the oil-soluble dispersing agent and nonvolatile carrier material and wherein said properties of the composition of matter are measured after removal of the volatile hydrocarbon solvent.

11. A method of preparing a composition of matter, which is particularly suitable as a rust inhibitor and as a grease and has the following properties:

1. it is thixotropic,
2. a dropping point of at least 480° F.,
3. does not flow at 210° F.,
4. an acetic base number of at least 50, said method comprising:
   A. forming an admixture consisting essentially of:

1. from about 2 to about 65 weight per cent of an alkaline earth metal salt of an oil-soluble hydrocarbyl sulfonic acid,
2. from about 5 to 80 weight per cent of a nonvolatile carrier material selected from the group consisting of mineral lubricating oils, paraffin wax and microcrystalline wax,
3. from about 1 to about 6 weight per cent water,
4. from about 10 to about 40 weight per cent methanol,
5. from about 2 to about 10 weight per cent calcium oxide, calcium hydroxide or calcium methoxide, said admixture being characterized further in that the amount of water is from about 0.25 to about 2.5 moles per mole of overbasing calcium metal present in said calcium oxide, calcium hydroxide or said calcium methoxide, B. carbonating the admixture of step (A) to the extent that at least 1.5 moles of carbon dioxide, per mole of calcium metal, are present in the admixture while maintaining the admixture at a temperature below about 50° C., and C. heating the carbonated admixture to a temperature above 100° C., said heating step being characterized in that the time of traversing the temperature range of from about 50° C. to about 100° C. requires a time period, $t$, as determined by the expression $- t = 0.75 + 1.6 (2.5-m)$, wherein $m$ is the ratio of moles of water to moles of calcium metal present as the carbonate in step (B), said time period being characterized further as being in the range of from about 0.5 to about 8 hours.

12. The method of claim 11 wherein the amount of calcium oxide, calcium hydroxide or calcium methoxide of step (A) (5) is sufficient to provide an acetic base number of at least 100 in the final product.

13. The method of claim 12 wherein the admixture of step (A) contains additionally from about 20 to about 80 weight percent of a volatile hydrocarbon solvent, having a boiling point below about 220° C., based on the combined weight of the calcium salt of oil-soluble hydrocarbyl sulfonic acid and nonvolatile carrier material and wherein said properties of the composition of matter are measured after removal of the volatile hydrocarbon solvent.

14. The method of claim 13 wherein the nonvolatile carrier material is a mineral lubricating oil.

15. The method of claim 13 wherein the nonvolatile carrier material is a paraffin wax.

16. The method of claim 13 wherein the nonvolatile carrier material is a microcrystalline wax.

17. A method of preparing a composition of matter, which is particularly suitable as a rust inhibitor and as a grease and has the following properties:

1. it is thixotropic,
2. a dropping point of at least 480° F.,
3. does not flow at 210° F.,
4. an acetic base number of at least 50, said method comprising:
   A. forming an admixture consisting essentially of:

1. from about 6 to about 8 weight per cent of a calcium salt of an oil-soluble hydrocarbyl sulfonic acid,
2. from about 10 to about 30 weight per cent of a nonvolatile carrier material selected from the group consisting of mineral lubricating oils, paraffin wax and microcrystalline wax,
3. from about 2 to 4 weight per cent water,
4. from about 20 to about 30 weight percent methanol,
5. from about 4 to about 8 weight per cent calcium oxide, calcium hydroxide or calcium methoxide, said admixture being characterized further in that the amount of water is from about 0.25 to about 2.5 moles per mole of overbasing calcium metal present in said calcium oxide, calcium hydroxide or said calcium methoxide, B. carbonating the admixture of step (A) to the extent that at least 1.5 moles of carbon dioxide, per mole of calcium metal, are present in the admixture, while maintaining the admixture at a temperature below about 50° C., and C. heating the carbonated admixture to a temperature above 100° C., said heating step being characterized in that the time of traversing the temperature range of from about 50° C. to about 100° C. requires a time period, $t$, as determined by the expression $- t = 0.75 + 1.6 (2.5-m)$, wherein $m$ is the ratio of moles of water to moles of calcium metal present as the carbonate in step (B), said time period being characterized further as being in the range of from about 0.5 to about 8 hours.

18. The method of claim 17 wherein:
 1. the calcium salt of an oil-soluble hydrocarbyl sulfonic acid is formed in situ by the neutralization of an oil-soluble hydrocarbyl sulfonic acid with calcium oxide, calcium hydroxide or calcium methoxide,
 2. the amount of calcium oxide, calcium hydroxide or calcium methoxide of step (A) (5) is sufficient to provide an acetic base number of 100 in the nonvolatile final product.

19. The method of claim 18 wherein the admixture of step (A) contains additionally from about 20 to about 80 weight per cent of a volatile hydrocarbon solvent, having a boiling point below about 220° C., based on the combined weight of the calcium salt of oil-soluble hydrocarbyl sulfonic acid and nonvolatile carrier material and wherein said properties of the composition of matter are measured after removal of the volatile hydrocarbon solvent.

20. The method of claim 19 wherein the nonvolatile carrier material is a mineral lubricating oil.

21. The method of claim 19 wherein the nonvolatile carrier material is a paraffin wax.

22. The method of claim 19 wherein the nonvolatile carrier material is a microcrystalline wax.

23. A method of preparing a composition of matter, which is particularly suitable as a rust inhibitor and as a grease and has the following properties:
 1. it is thixotropic,
 2. a dropping point of at least 480° F.,
 3. does not flow at 210° F.,
 4. an acetic base number of at least 50, said method comprising:
 A. forming an admixture consisting essentially of:

1. from about 2 to about 65 weight per cent of an oil-soluble dispersing agent selected from the group consisting of oil-soluble hydrocarbyl sulfonic acids, oil-soluble carboxylic acids, oil-soluble phosphorous sulfide treated olefins and alkaline earth metal salts of said sulfonic acids, carboxylic acids or phosphorus sulfide treated olefins,
 2. from about 5 to about 80 weight per cent of a nonvolatile carrier material selected from the group consisting of mineral lubricating oils, synthetic lubricating oils, animal oils, vegetable oils, and petroleum waxes,
 3. from about 10 to about 40 weight per cent of a $C_1$–$C_3$ alkanol;

B. adding to the admixture of step (A) from about 2 to about 10 weight per cent of an alkaline earth metal oxide, hydroxide or $C_1$–$C_3$ alkoxide;

C. carbonating the admixture of step (B) to the extent that at least 1.5 moles of carbon dioxide per mole of alkaline earth metal are present in the admixture while maintaining the admixture at a temperature below about 50° C.;

D. adding to the carbonated admixture of step (C) from about 0.25 to about 5 moles of water per mole of over-basing alkaline earth metal present while maintaining the admixture at a temperature below 70° C.;

E. heating the admixture of step (D) to a temperature above 100° C., said heating step being characterized in that the time required to heat to 100° C. is from about 0.5 to about 8 hours.

24. The method of claim 23 wherein the oil-soluble dispersing agent is an oil-soluble hydrocarbyl sulfonic acid.

25. The method of claim 24 wherein the alkaline earth metal is calcium or magnesium.

26. The method of claim 25 wherein the alkaline earth metal is calcium.

27. The method of claim 26 wherein the nonvolatile carrier material is a mineral lubricating oil.

28. The method of claim 26 wherein the nonvolatile carrier material is a petroleum wax.

29. The method of claim 27 wherein the petroleum wax is a microcrystalline wax.

30. The method of claim 26 wherein the admixture of step (A) contains additionally from about 20 to about 80 weight per cent of a volatile hydrocarbon solvent, having a boiling point below about 220° C., based on the combined weight of the oil-soluble dispersing agent and nonvolatile carrier material and wherein said properties of the composition of matter are measured after removal of the volatile hydrocarbon solvent.

31. The method of claim 30 wherein the nonvolatile carrier material is a mineral lubricating oil.

32. The method of claim 30 wherein the nonvolatile carrier material is a petroleum wax.

33. The method of claim 30 wherein the nonvolatile carrier material is a microcrystalline wax.

34. A method of preparing a composition of matter, which is particularly suitable as a rust inhibitor and as a grease, said method comprising:
 A. forming an admixture consisting essentially of:

1. from about 6 to about 8 weight per cent of a hydrocarbyl sulfonic acid or calcium salt of an oil-soluble hydrocarbyl sulfonic acid,
 2. from about 10 to about 30 weight per cent of a nonvolatile carrier material selected from the group consisting of mineral lubricating oils and petroleum waxes,
 3. from about 20 to about 30 weight per cent methanol,
 4. from about 25 to about 45 per cent of a volatile hydrocarbon solvent having a boiling point below about 220° C.;

B. adding to the admixture of step (A) from about 4 to about 8 weight per cent calcium oxide, calcium hydroxide or calcium methoxide;

C. carbonating the admixture of step (B) to the extent that at least 1.5 moles carbon dioxide per mole of calcium metal are present in the admixture while maintaining the admixture at a temperature below about 50° C.;

D. adding to the carbonated admixture of step (C) from about 0.25 to about 5 moles of water per mole of over-basing calcium metal present while maintaining the admixture at a temperature below about 70° C.;

E. heating the admixture of step (D) to a temperature above 100° C., said heating step being characterized in that the time required to heat to 100° C. is from about 0.5 to about 8 hours, said method being characterized further in that the composition of matter resulting therefrom, after removal of the volatile hydrocarbon solvent, has the following properties:

1. it is thixotropic,
2. a dropping point of at least 480° F.,
3. does not flow at 210° F., and
4. an acetic base number of at least 50.

35. The method of claim 34 wherein the material of step (A) (1) is a hydrocarbyl sulfonic acid.

36. The method of claim 35 wherein the carbonation temperature in step (C) is below about 40° C.

37. The method of claim 36 wherein the temperature during the addition of water in step (D) is below about 66° C.

38. The method of claim 37 wherein the heating time of step (E) is from about 1 to about 4 hours.

39. The method of claim 38 wherein the amount of water added in step (D) is about 1.5 moles.

40. The method of claim 39 wherein the nonvolatile carrier material is a mineral lubricating oil.

41. The method of claim 39 wherein the nonvolatile carrier material is a petroleum wax.

42. The method of claim 41 wherein the petroleum wax is a microcrystalline wax.

43. A method of preparing a composition of matter, which is particularly suitable as a rust inhibitor and as a grease, said method comprising:

A. forming an admixture consisting essentially of:

1. about 7 weight per cent of an oil-soluble dispersing agent selected from the group consisting of oil-soluble hydrocarbyl sulfonic acids and calcium salts of hydrocarbyl sulfonic acids, 2. from about 10 to about 30 weight per cent of a nonvolatile carrier material selected from the group consisting of mineral lubricating oils and microcrystalline waxes,
3. about 30 weight per cent methanol,
4. from about 25 to about 45 per cent of a volatile hydrocarbon solvent having a boiling point below about 220° C., B. adding to the admixture of step (A) about 5 weight per cent calcium oxide, calcium hydroxide and calcium methoxide;

C. carbonating the admixture of step (B) to the extent that from about 1.1 to about 1.3 moles of carbon dioxide are present per mole of overbasing calcium metal present in the admixture while maintaining the admixture at a temperature below about 40° C.;

D. adding to the carbonated admixture of step (C) from about 0.25 to about 5.0 moles of water per mole of overbasing calcium metal present while maintaining the admixture at a temperature below about 66° C.;

E. heating the admixture of step (D) to a temperature above 100° C., said heating step being characterized in that the time required to heat to 100° C. is from about 1 to about 4 hours, said method being characterized further in that the composition of matter resulting therefrom, after removal of the volatile hydrocarbon solvent, has the following properties:

1. it is thixotropic,
2. a dropping point of at least 480° F.,
3. does not flow at 210° F., and
4. an acetic base number of at least 50.

44. The method of claim 43 wherein:

1. the oil-soluble dispersing agent is an oil-soluble hydrocarbyl sulfonic acid, and
2. calcium hydroxide is used in step (B).

45. The method of claim 44 wherein the amount of water added in step (D) is about 1.5 moles.

46. The method of claim 45 wherein the nonvolatile carrier material is a mineral lubricating oil.

47. The method of claim 45 wherein the nonvolatile carrier material is a microcrystalline wax.

* * * * *